United States Patent Office.

HERMANN O. FRANK, OF MILWAUKEE, WISCONSIN.

SOLIDIFYING COLORED FIRE.

SPECIFICATION forming part of Letters Patent No. 420,642, dated February 4, 1890.

Application filed May 24, 1889. Serial No. 311,992. (No specimens.)

*To all whom it may concern:*

Be it known that I, HERMANN O. FRANK, of Milwaukee, in the county of Milwaukee, and in the State of Wisconsin, have invented certain new and useful Improvements in a Process for Converting Pyrotechnic Powders into Solid Form for Convenience in Transportation, Storage, and Combustion; and I do hereby declare that the following is a full, clear, and exact description thereof.

My invention relates to the manufacture of pyrotechnics; and it consists in a method of converting "red fire" and analogous powders into solid form for convenience in transportation, storage, and combustion, as will be fully set forth hereinafter, and subsequently claimed.

In illustrating my invention I will first describe my method of making a solid red fire. I take six parts (all proportions being given by weight) of nitrate of strontian, two parts of ground shellac, and one and one-half part of chlorate of potash, and add to the same three-fourths of a part, by weight, of alcohol, and mix the same all thoroughly together while in a warm condition in a water bath, raising the temperature to about 200° Fahrenheit and stirring gradually and occasionally for about fifteen minutes, when the mass will be in a soft pasty condition. I then take suitable molds (preferably of brass) and coat the interior of the same with vaseline or other analogous substance and transfer the soft mass thereto while it is still warm and allow it to cool and harden in the molds, when it is ready for storage, transportation, or use. Preferably I mold the mass into conical shape, and it will burn longer, with a clearer and steadier flame, and give out a better light than the same quantity of red fire in a powdered condition, besides being vastly more portable and convenient and much safer to handle and ignite. A solid cake of "green fire" can be made in the same manner by substituting nitrate of barium for the nitrate of strontian and otherwise proceeding as before, and other pyrotechnic powders can be converted into a solid form by substantially the same process.

Having thus described my invention, what I claim as new, and desire to secure by Letters Patent, is—

1. The hereinbefore-described process of converting pyrotechnic powders into solid form, consisting in adding a small quantity of alcohol to the powdered ingredients and mixing the whole thoroughly together in a water bath at a temperature of about 200° Fahrenheit until the mass is in a soft pasty condition, and then while still warm pressing the mass into molds previously coated with vaseline or other analogous substance and leaving it there until cool and hardened, substantially as set forth.

2. The process of forming a solid red-fire or green-fire combustible cake, consisting in mixing together nitrate of strontian or barium, ground shellac, and chlorate of potash with alcohol in a water bath at a temperature of about 200° Fahrenheit and stirring the same at brief intervals for about fifteen minutes until the mass becomes a soft paste, then coating brass molds with vaseline or analogous substance and transferring the mass thereto while still warm and retaining it in the mold till it becomes cool and hard, substantially as set forth.

In testimony that I claim the foregoing I have hereunto set my hand, at Milwaukee, in the county of Milwaukee and State of Wisconsin, in the presence of two witnesses.

HERMANN O. FRANK.

Witnesses:
H. G. UNDERWOOD,
WILLIAM KLUG.